US006855053B2

(12) United States Patent
Baerlocher

(10) Patent No.: US 6,855,053 B2
(45) Date of Patent: Feb. 15, 2005

(54) GAMING APPARATUS AND METHOD

(75) Inventor: Anthony Baerlocher, Reno, NV (US)

(73) Assignee: IGT, Reno, NV (US)

( * ) Notice: Subject to any disclaimer, the term of this patent is extended or adjusted under 35 U.S.C. 154(b) by 88 days.

(21) Appl. No.: 09/964,060

(22) Filed: Sep. 26, 2001

(65) Prior Publication Data

US 2003/0060251 A1 Mar. 27, 2003

(51) Int. Cl.[7] .................................................. A63F 13/00
(52) U.S. Cl. .............................. 463/16; 463/20; 463/13
(58) Field of Search .............................. 463/16–29, 12, 463/13

(56) References Cited

U.S. PATENT DOCUMENTS

| | | | | | |
|---|---|---|---|---|---|
| 6,015,346 | A | | 1/2000 | Bennett | |
| 6,033,307 | A | * | 3/2000 | Vancura | 463/20 |
| 6,089,976 | A | * | 7/2000 | Schneider et al. | 463/16 |
| 6,106,393 | A | * | 8/2000 | Sunaga et al. | 463/20 |
| 6,146,273 | A | * | 11/2000 | Olsen | 463/27 |
| 6,174,235 | B1 | * | 1/2001 | Walker et al. | 463/25 |
| 6,261,177 | B1 | | 7/2001 | Bennett | |
| 6,309,300 | B1 | * | 10/2001 | Glavich | 463/26 |
| 6,514,141 | B1 | * | 2/2003 | Kaminkow et al. | 463/25 |

FOREIGN PATENT DOCUMENTS

| | | | | |
|---|---|---|---|---|
| EP | 0 945 837 A2 | | 3/1999 | |
| GB | 2144644 A | * | 3/1985 | A63F/9/22 |

OTHER PUBLICATIONS

European Search Report (3 pps.) (Mar. 19, 2004).

* cited by examiner

*Primary Examiner*—Jessica J. Harrison
(74) *Attorney, Agent, or Firm*—George H. Gerstman; Seyfarth Shaw LLP

(57) ABSTRACT

A gaming apparatus includes a wager receipt mechanism and a player interface each having a display device, a payout device, and a processor. A processor is coupled with the wager receipt mechanism, the player interface, the payout device and operating under stored program control. A stored program control is operable for displaying an array of first indicia respectively masking second indicia on the display. A first indicia is player-selectable for revealing the associated second indicia in an attempt to reveal at least one matching group of second indicia. A stored program control is operable to select a pay value, from a plurality of possible pay values, and associate the selected pay value with at least one of the second indicia from the at least one matching group of second indicia.

24 Claims, 6 Drawing Sheets

GAMING APPARATUS AND METHOD

BACKGROUND

This application relates generally to a gaming method and apparatus and, in particular, to a method and apparatus utilizing a video gaming machine including a primary game and a player-interactive bonus game which is activated upon the occurrence of a bonus-qualifying outcome to the basic game.

In an effort to provide greater game interest and entertainment value for players, gaming establishments have introduced various types of "progressive" or multi-tiered games. One such gaming concept is implemented in gaming machines which provide a primary or basic game and a secondary or bonus game, which may comprise any type of game, either similar to or different from the basic game, the bonus game being automatically activated upon the occurrence of a bonus-qualifying outcome to the basic game. For example, the basic game may constitute a standard reel-type slot machine game, implemented on a video-type display, the bonus game being entered upon the occurrence of a particular outcome to the basic game. The bonus game may be a matching game wherein the player is presented with a display of an array of first indicia, such as icons, masking a set of second indicia, such characters, which the player then selects, preferably one at a time. As each icon is selected its character is revealed, and selection continues until two matching characters are revealed. Prior versions of this gaming concept have provided bonus payouts with present payouts based on the second indicia that are matched. However, the payouts for matching a particular set of second indicia remained the same from game to game. Thus, player interest tends to dwindle as play progresses. Additionally, the pay out values for matching a given pair of characters was not shown until the player matched the pair of characters unless the player pressed one or more buttons to display the odds of winning. Thus, player excitement and anticipation from revealing one of a pair of a matching pair having a high pay out value was not heightened as often as it could be.

SUMMARY

This application discloses a gaming apparatus and method which avoid disadvantages of prior apparatuses and methods while affording additional structural and operating advantages.

One aspect is the provision of an improved gaming apparatus and method which offers enhanced player interest and excitement.

Another aspect is the provision of a gaming apparatus and method of the type set forth, wherein player payouts associated with a particular winning combination can change from one round to the next.

In one embodiment of the invention, certain ones of these and other aspects are attained by providing a gaming apparatus comprising a wager receipt mechanism; a player interface including a display device; a payout device; and a processor coupled to the wager receipt mechanism and to the player interface and to the payout device and operating under stored program control, the stored program control operable for displaying an array of first indicia respectively masking second indicia on the display, the first indicia being player-selectable for revealing the associated second indicia in an attempt to reveal at least one matching group of second indicia, the stored program control operable to select a pay value, from a plurality of possible pay values, and associate the selected pay value with at least one of the second indicia from the at least one matching group of second indicia.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
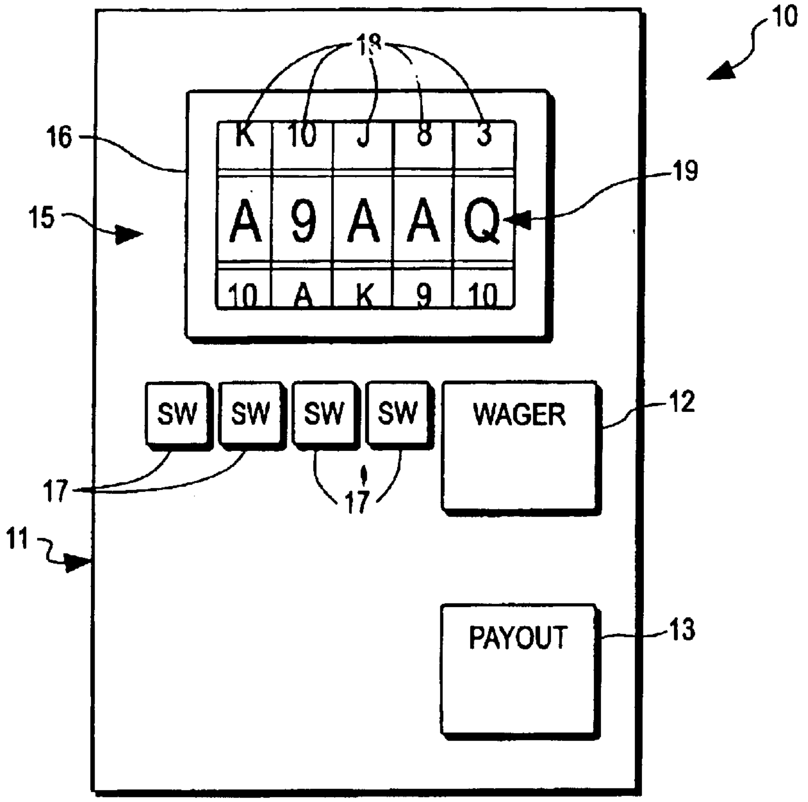
FIG. 1 is a diagrammatic illustration of a gaming machine.

Referring to FIG. 1, there is shown a simplified and somewhat diagrammatic illustration of a gaming machine, generally designated by the numeral 10, which has a housing 11 which houses the mechanism of the machine, in a known manner. The gaming machine 10 is provided with a suitable wager receipt mechanism 12, which could include any one or more of a card reader which may have an associated alphanumeric key pad, a currency or a ticket receiver, a coin or token receiver, or the like, and a payout device 13, which may include one or more of a coin or token dispenser, a card or ticket dispenser, a credit display mechanism, or the like. The machine 10 also has a player interface 15, including a touch screen video display 16 and a plurality of decision switches 17 which are player-accessible from the front panel of the housing 11.

Figure 2:
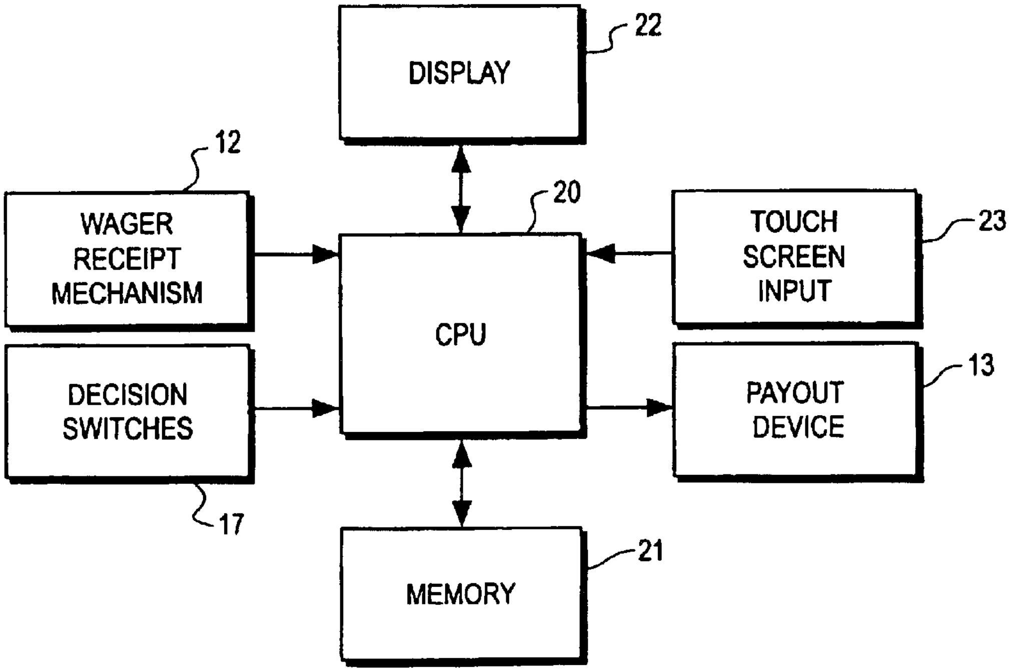
FIG. 2 is a functional block diagrammatic illustration of a control system suitable for the gaming machine of FIG. 1.

Referring to FIG. 2, the gaming machine 10 includes a central processing unit 20, which may be a microprocessor, and an associated memory 21. The touch screen display 16 includes a display screen 22 and a touch screen input mechanism 23, which records a player's touches on the screen in a known manner, both the display 22 and the touch screen input 23 being coupled to the CPU 20. The wager receipt mechanism 12, the payout device 13 and the decision switches 17 are also coupled to the CPU 20, again in a known manner.

In the illustrated embodiment, the touch screen is displaying a reel-type game including five reels which are depicting playing cards in a poker-type game. Such a display may be associated with a basic game playable on the gaming machine 10. While a reel-type basic game is illustrated, it will be appreciated that the basic game could be of any of a number of different known types. Additionally, such reel-type game can be a mechanical reel or a video-type reel displayed on video display 16. In one form of the illustrated poker-type reel game illustrated, one of the decision switch is 17 may be a "spin" switch which causes the reels 18 to spin, simulating a deal of a poker hand, that poker hand being illustrated on a front-most line 19 of aligned characters on the reels. In a draw-type poker game, other switches may be provided for indicating whether or not the player wishes to hold a dealt card or draw an additional card, whereupon another spin of the non-held cards will occur, again all in a known manner. The line 19 will display the final hand.

Figure 3:
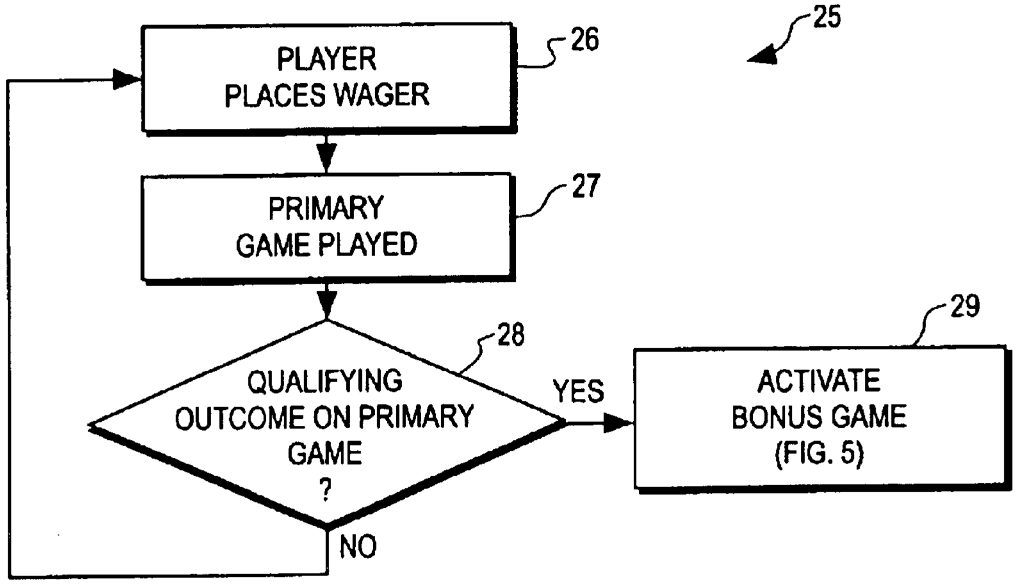
FIG. 3 is a flowchart of a processor program routine associated with the basic game of the machine of FIG. 1.

Referring to FIG. 3, there is illustrated a flowchart 25 depicting a software program routine associated with the play of the basic game of the gaming machine 10, illustrated in the display of FIG. 1. At 26, the player places a wager, whereupon the primary or basic game is played at 27. When the basic game is completed, the program, at 28, checks to see if the outcome of the primary or basic game is a bonus-qualifying outcome. In the poker-type game illustrated in FIG. 1, for example, any final poker hand of three of a kind or better might constitute a bonus-qualifying outcome. If such an outcome is not achieved, the program returns to 26 for another wager placement. If the outcome is bonus-qualifying, the program then automatically activates a bonus game, at 29.

Figure 4:
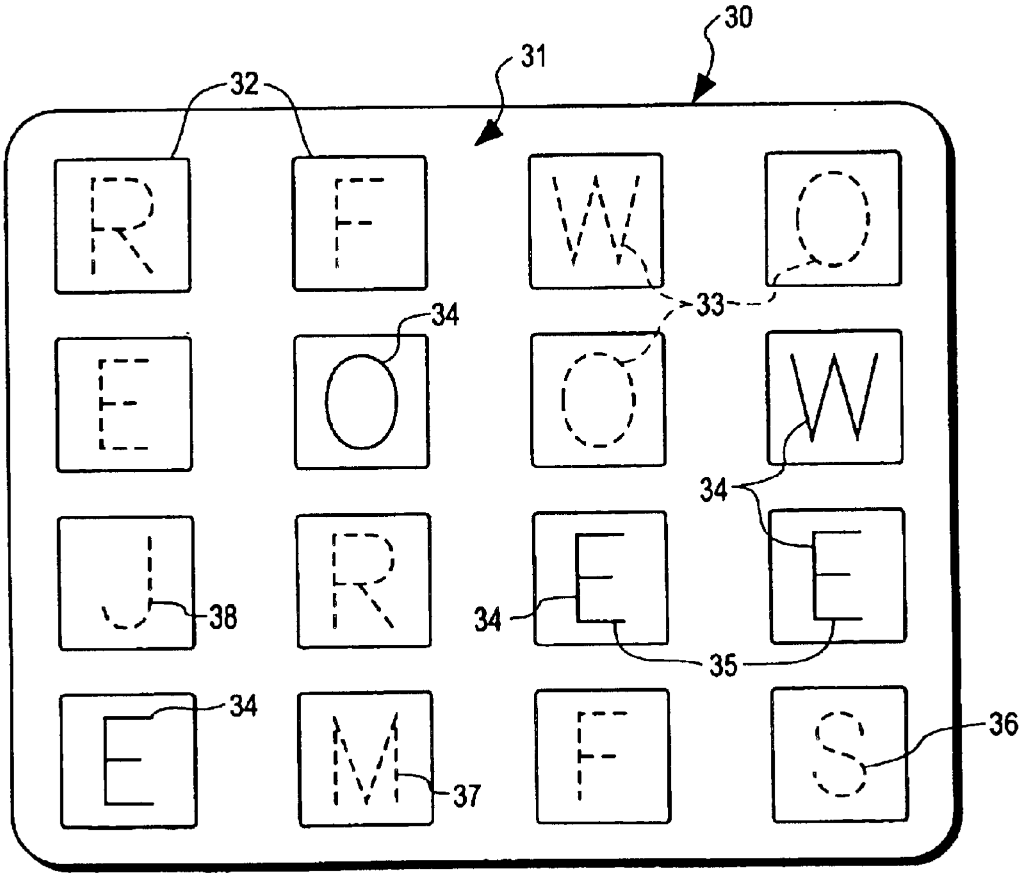
FIG. 4 is an enlarged, diagrammatic view of a screen display of a bonus game of the gaming machine of FIG. 1.

Referring to FIG. 4, there is illustrated a screen display 30 for such a bonus game, which will automatically be displayed upon activation of the bonus game. The display 30 comprises an array 31 of a predetermined number of character icons 32. In the illustrated display there are 16 such icons arranged in four rows and four columns, but it will be appreciated that any desired number could be provided. Each of the icons 32 is associated with a different one of a set of characters. In the simplified embodiment illustrated, all of the characters except one are capital letters. When the bonus game is initially activated, all of the characters are masked, i.e., they are not visible to the player, this masking being designated by depiction of the characters in broken lines, as at 33. The character icons 32 are player-selectable, for example, one-at-a-time, and as an icon 32 is selected by the player its associated character is revealed, i.e., they are visible to the player, being illustrated by the character shown in solid line, as at 34. Player selection could be by any of a number of known techniques but, in the illustrated embodiment, wherein the gaming machine 10 includes a touch screen video display 16, selection is effected by the player touching the area of the screen on which the selected icon 32 is displayed.

The object of the game is to reveal a group of matching characters, such as the pair 35 of matching characters 34 in the illustrated embodiment. The payout of the game depends on the number of groups of matching characters that the player reveals before the game is ended. In the illustrated embodiment of FIG. 4, a matching pair 35 of the character "E" have already been revealed. However, the player might also reveal another matching pair of the character "E", a pair of the character "R", a pair of the character "F" and a pair of the character "W". Although, revealing matching pairs of characters have been discussed, it is also possible that a player would need to match a group of characters larger than 2, such as a group of 3, 4, etc, of characters.

One or more stopper characters 36 can be provided to signal the end of the game when stopper character 36 is revealed. Additionally, one or more multiplier characters 37, 38 can be provided and used to multiply the payout amount for revealing matching groups 35 of characters 34. Although a pair 35 of matching characters are shown in FIG. 4, a prize might only be awarded after groups of 3, 4, or more matching characters are revealed. Additionally, one prize might be awarded after matching two characters and another prize may be awarded for matching a third, a fourth, etc. matching character with an existing revealed matching pair of characters.

Figure 5:
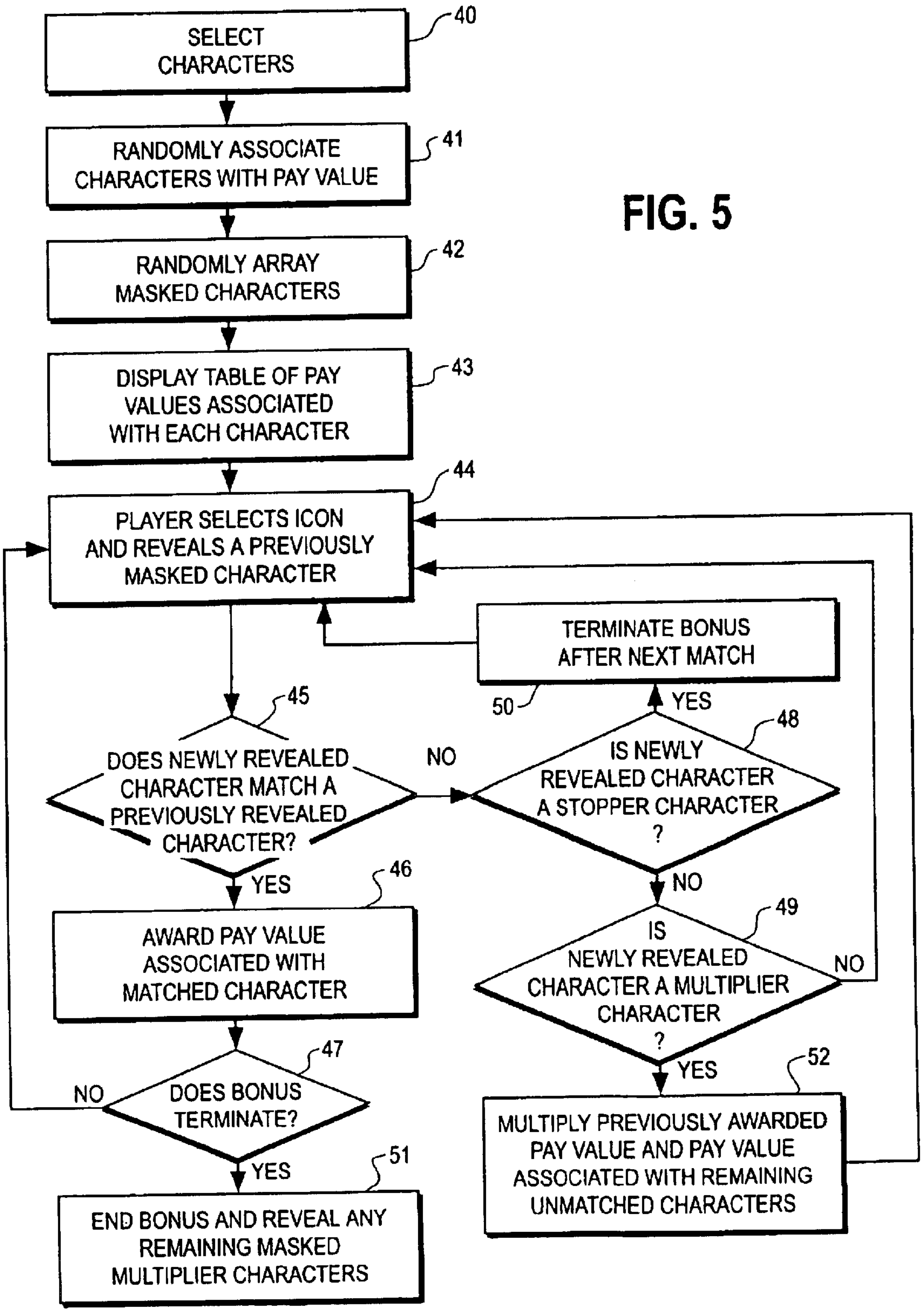
FIG. 5 is a flowchart of a software program routine associated with the bonus game of FIG. 4.

Referring to FIG. 5, there is shown a flowchart illustrating a program routine of the central processing unit 20 for controlling the bonus game illustrated in FIG. 4. When the bonus game is initially activated, at 40, a program running on CPU 20 selects the characters to be displayed in each position of array 31 displayed on display 30. In one form, all of the available characters are used at least once in the array 31 displayed on display 30. However, characters can be selected from a pool of characters that is larger than the number of different characters that are actually displayed, or that can possibly be displayed in the array 31 of characters on display 30.

At 41, at least one and preferably several of the characters are associated with a pay value from a pool of possible pay values. In one form, each pay value is associated with a collective group 35 of characters to be matched. In that form, the entire group 35 must be matched to obtain a single pay value. In another form, the pay value can be associated with one character in the group 35 of characters to be matched. In yet another form, the pay value can be associated with each character in a matching group 35 of characters and the pay value for each character in the matching group 35 can be the same, or different. In this situation, the pay value for matching such a group of characters might be the sum of the pay values for each character in the matching group 35 or the highest pay value for any character in the matching group 35.

In one form, the pay values can be randomly associated with each characters 34 or each group 35 of matching characters 35. In another form, certain characters or certain group of matching characters can have a specific pay value associated with that particular character or particular group 35 of matching characters, such that the value associated that specific character or group 35 is the same from one game to another and others of the characters or groups 35 can have pay values that are randomly associated with each of them. In another form, a first subset of characters 34 or a first subset of groups 35 of characters can have pay values, that are randomly selected from a first subset of the available pay values, associated with each of them. This allows, for example, higher values to be associated with characters that are more popular or that are perceived to be "lucky." Additionally, a second subset of the characters can have pay values randomly associated from a second subset of pay values that are lower than all or most of the pay values in the first subset of pay values.

In one form, one or more stopper characters 36 are also selected, at 40, for display in the array of characters on screen 30. Stopper character 36 signals the end of the game and may, or may not, have a pay value associated with revealing the stopper character 36. Additionally, one or more multiplier characters 37, 38 can be selected, at 40, for display in the array of characters on display 30. The multiplier characters 37 and 38 have some number associated with it, such as 0, 1.5, 2, 2.5, 3, etc. and is used to increase the amount awarded to a player during the bonus game. At 42, the masked characters 33 and stopper character 36 and multipliers 36, 38 are arrayed, preferably in a random order, in a masked form on display 30. At 43, a pay table 39 can be displayed showing the pay value associated with each character, matching group 35 of characters, or at least one character in a matching group 35 of characters.

At 44, the player begins, selecting icons 32 to reveal previously masked characters 33, 36, 37, or 38. Characters 33, 36, 37 and 38 are masked using icons 32 that, for example, cover the characters or that are displayed in place of the characters. If icons 32 are displayed in place of the characters, then when icons 32 are selected, the selected icon 32 is replaced by the associated characters 34, 36, 37 and 38 that is designated to be in that spot being held by the associate selected icon 32 in the array 31 displayed on display 30. Although the term reveal and masked has been used, the term mask is hereby understood to include any method for making the characters so they are not visible to or easily recognizable by the player in array 31 and revealing is hereby understood to include any method for making such characters visible to or easily recognizable by the player.

At 45, the gaming machine determines whether the newly revealed character 34, 36, 37 or 38, associated with the selected icon 32, matches a previously revealed character. If there is a match and the match completes a group 35 of matching characters, whether the group numbers 2, 3, 4, etc., the pay value associated with the matched character(s) 34 or group 35 of match characters is awarded, at 46. If there is no match, then at 48 and 49, it is determined whether the newly revealed character is a stopper character 36 or a multiplier character 37, 38.

If a stopper character 36 is revealed, that signals the end of the game. In one form, the game may terminate immediately after the stopper character 36 is revealed. In another form, the game can terminate after the next character 34 is revealed after the stopper character 36 is revealed. However, in the depicted form, the stopper character signals the end of the game and, as indicated at 47 and 50, the bonus round is terminated after the next group of characters are matched. In this case, the player is again allowed to select additional icons 32 until the player reveals the last character 34 in a group 35 of matching characters (see 46 and 47.) In one form, when the bonus round ends, the remaining masked multiplier characters 37, 38 and/or other characters 34 can be revealed, as shown in 51.

At 49, it is determined whether a multiplier character was selected and if such character is revealed, then the remaining pay values are all multiplied, at 52, by the amount associated with the multiplier character. Additionally, a multiplier character can also be used to multiply the amount previously awarded for matching groups 35 of characters during the bonus rounds. In one form, the multiplier character can even be used to multiply the amount won prior to the beginning of the bonus round. If a multiplier character 37, 38 is revealed, the pay chart 39 can be changed to reflect the multiplied amounts.

Figure 6:
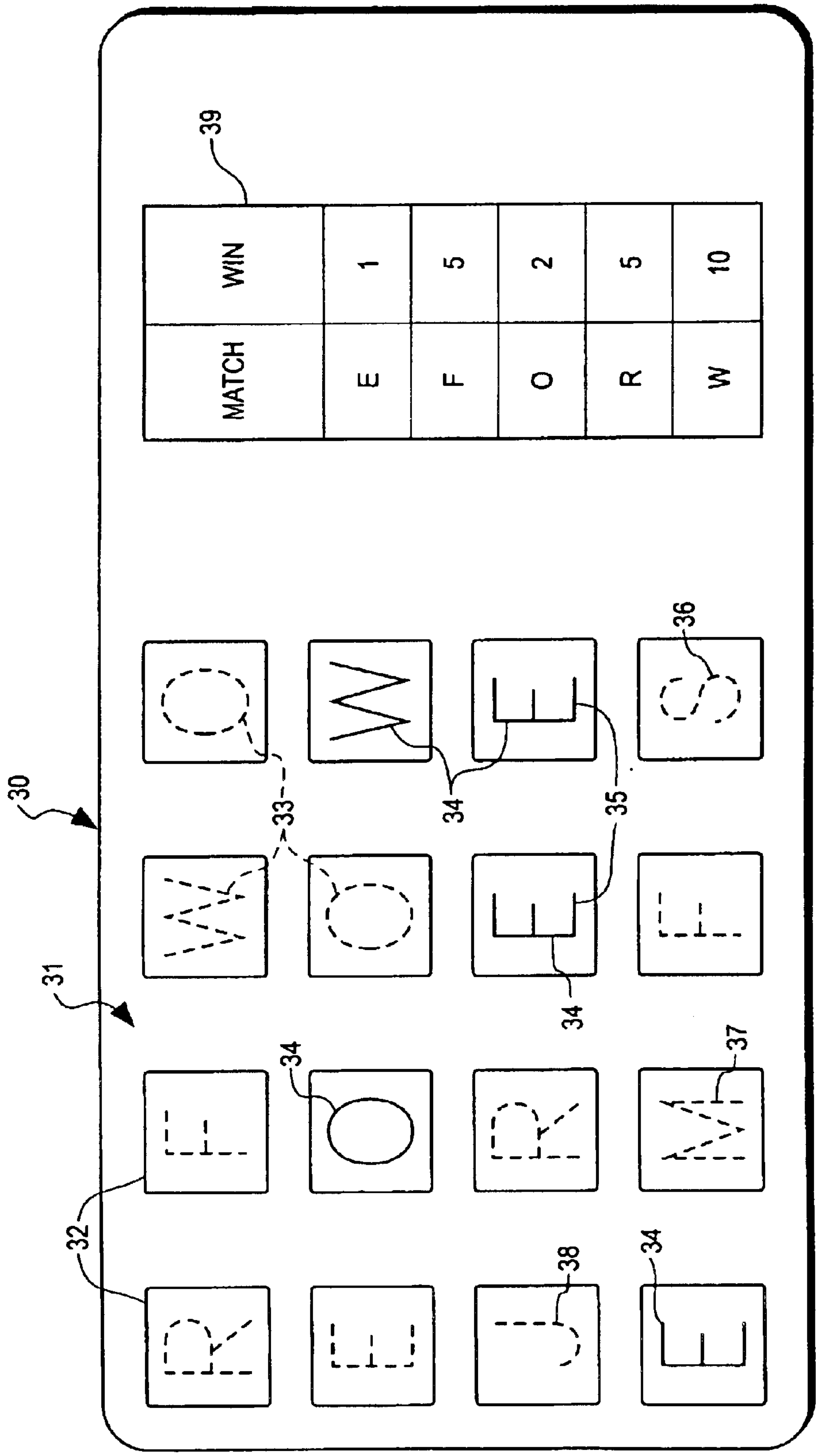
FIG. 6 is an enlarged, diagrammatic view of an alternate form of screen display of a bonus game of the gaming machine of FIG. 1.

FIG. 6 is an alternative form of the bonus round, which includes a pay table 39 displayed on the screen 30 during bonus round play. In one form, pay table 39 is displayed as soon as array 31 is displayed on the display 30 and can continue to be displayed throughout the bonus round.

As previously mentioned, pay values can be awarded for matching a group 35 of two or more characters 34 that match. In another form, additional pay values can be awarded for matching an additional character with a previously matched group 35 of characters. Also, as shown in FIG. 4, it is possible that more than two pairs of the same matching character may be in the array displayed on display 30. In such a case, if a pay value is awarded for matching pairs of characters 34, then at 45 it would need to be determined whether the revealed character 34 matched a previously revealed character 34 that is not already part of a group 35 of matching characters. In another alternative form, a multiplier character 37, 38 can also be used as a stopper character 36, such that revealing a particular multiplier/stopper character signals the end of the game and results in a multiplication of an amount awarded to the player. In yet another form, stopper character 36 may have a matching stopper character and revealing the second of the two matching stopper characters can signal the end of the game, while revealing the first stopper character 36 may be of no great significance.

Figure 7:
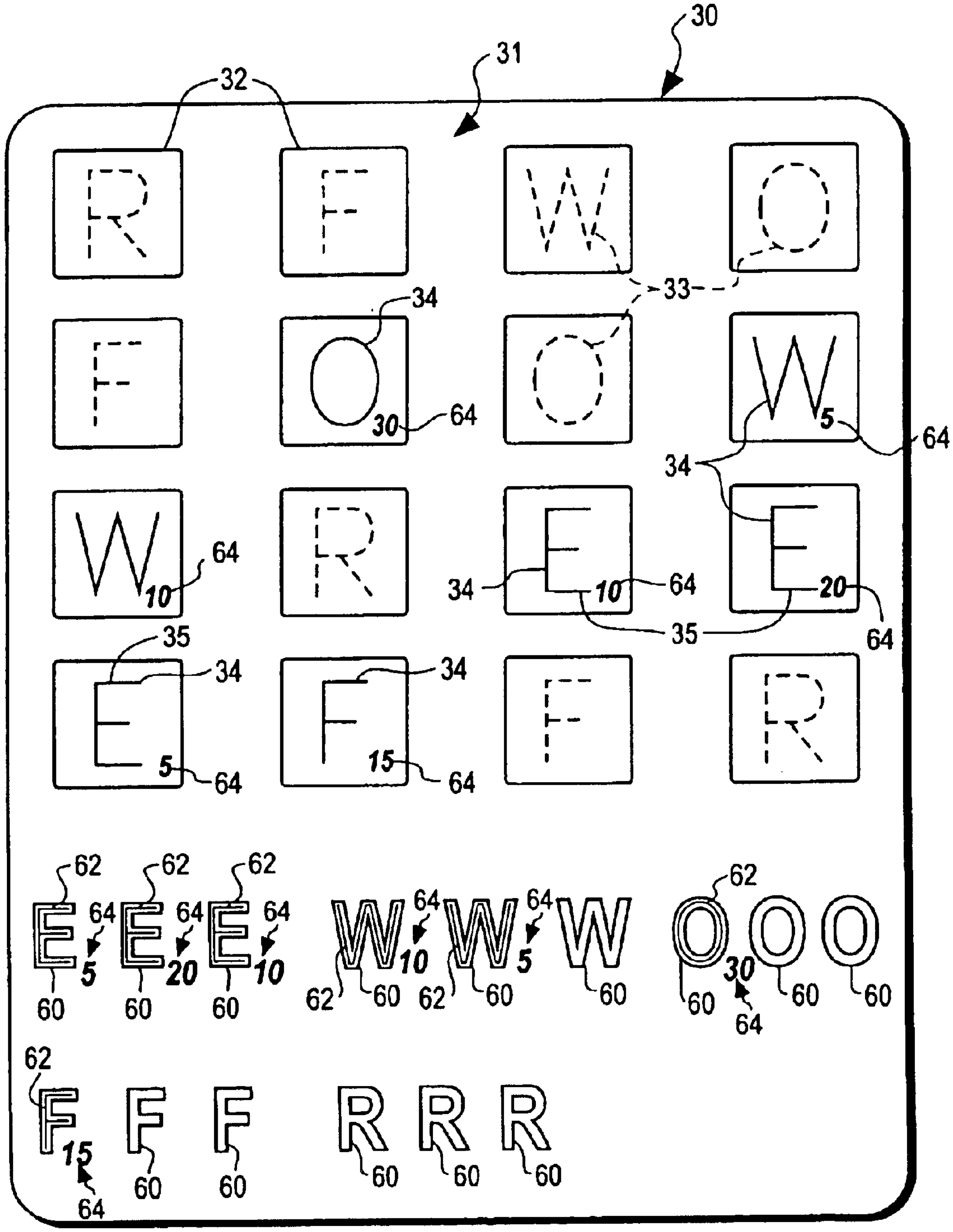
FIG. 7 is an enlarged, diagrammatic view of a screen display of an alternative form of bonus game.
Figure 8:
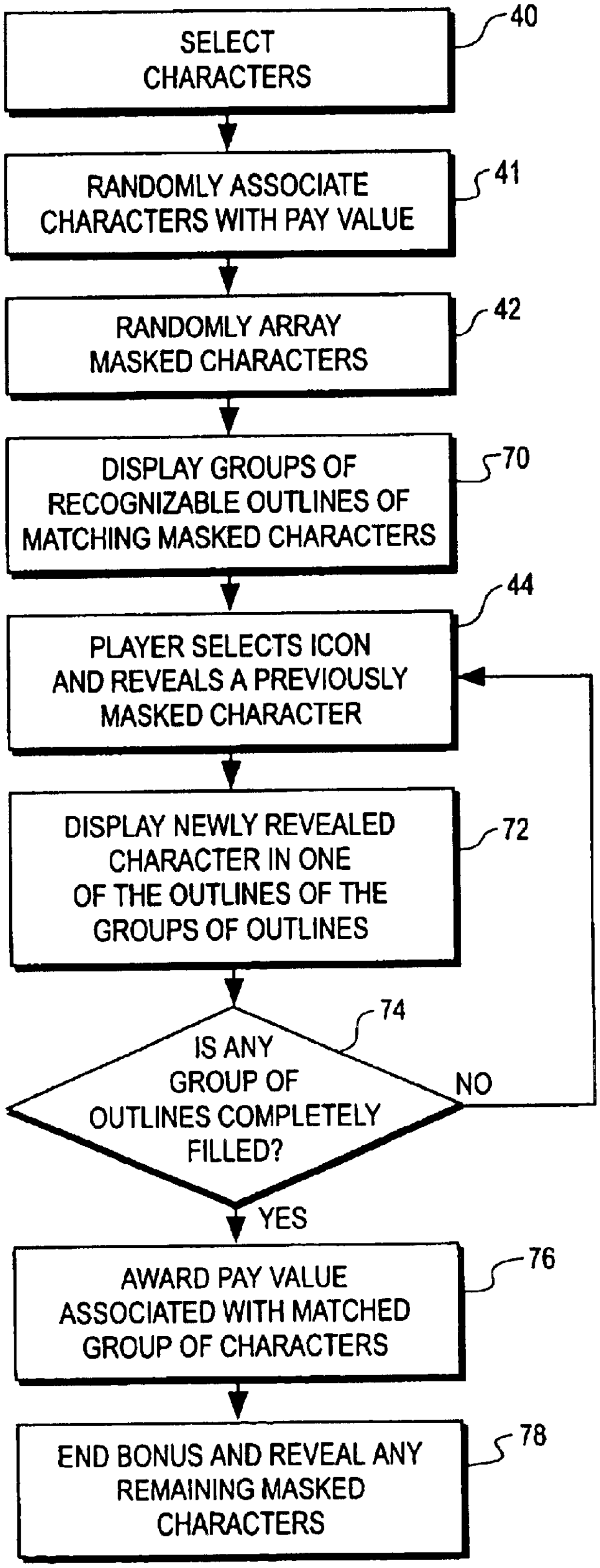
FIG. 8 is a flowchart of a software program routine associated with the bonus game of FIG. 7.

Referring to FIGS. 7 and 8, there is shown an alternative form of a bonus round. Like the previously form, this bonus round includes an array 31 of characters displayed on screen 30. The characters are masked by icons 32 and the masked characters are depicted in broken lines, whereas the revealed characters 34 are depicted in solid lines. A portion of display 30 depicts matching groups of recognizable outlines 60 of the characters 33, 34. When a character is revealed 34, a representation 62 of such character fills in one of the recognizable outlines 60 that correspond with the revealed character 34.

This form of bonus round is somewhat similar to the previously described version. For example, 40, 41 and 42 in FIG. 8 are substantially similar to 40, 41, and 42 in FIG. 5. However, in this version, groups of recognizable outlines 60 of matching masked characters are depicted on screen 30 during the bonus round. In a preferred form, the recognizable outlines are displayed before a player begins selecting icons 32 and continue to be displayed throughout the bonus round. At 44, the player selects an icon 32 and reveals a previously masked character in a manner like those previously described. In a preferred form, at 72, as each character is revealed, a pay value 64 associated with the revealed character 34 is depicted along with the revealed character 34. This pay value 64 can also be displayed adjacent the representation 62 of the newly revealed character 34.

At 74, the gaming apparatus determines whether any group of outlines have been completely filled or whether a group of characters has been matched. If an entire group has not been matched or no group of outlines is completely filled, then the player continues selecting icons 32. If a group of characters has been matched or any group of outlines have been completely filled, then a pay value can be awarded at 76. The pay value can be the sum of the pay values 64 associated with each of the revealed characters 34 in the matching group 35 of characters. At 78, the bonus round ends and, in one form, the gaming apparatus reveals any remaining masked characters 33.

While this embodiment has not been depicted with multiplying characters or stopper characters, such characters can be provided. Additionally, while this alternate version depicts each character as having a randomly selected pay value associated with each separate character in the matching group 35 of characters, the same pay value can be associated with each of the characters in the matching group of characters. Alternatively, one pay value could be associated with matching the entire matching group 35 of characters. In another form, the pay value could be associated with one of the characters in the matching group 35 of characters, while the rest of the group of matching characters could be valued at zero. This embodiment can also include the various alternatives previously described with respect to other embodiments. For example, the pay values may not be randomly selected and associated with each character. In one form, a subset of characters might be associated with pay values selected from a subset of a pool of possible pay values. Alternatively, a particular character may always have the same value, whereas the other characters may have values that change from game to game. While the depicted matching group of characters, in each disclosed embodiment, consist of matching groups of identical letters, as an alternative such characters can be shapes, symbols, pictures, colors, cartoon characters, people or other depictions or other items that could be matched. Furthermore, the matching groups of characters need not be identical or even the same characters. For example, different movie, play or music titles from the same genre or type might be matched. Alternatively characters from a particular tv show might be matched with other characters from the same tv show.

Additionally, one having ordinary skill in the art will understand that the term indicia, as used herein, does not mean plural indicium. Instead, the term indicia is, essentially, interchangeable with the term indicium and can refer to a single indicium.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A gaming apparatus comprising:

a wager receipt mechanism a player interface including a display device;

a payout device; and a processor coupled to the wager receipt mechanism and to the player interface and to the payout device and operating under stored program control, the stored program control operable for displaying an array of first indicia respectively masking second indicia on the display, the first indicia being player-selectable for revealing the associated second indicia in an attempt to reveal at least one matching group of second indicia, said second indicia being characters or the like that are not pay values, the stored program control operable to select first and second pay values, from a plurality of possible pay values, and to randomly associate the selected first pay value with at least one of the second indicia from a first matching group of second indicia and to randomly associate the selected second pay value with at least one of the second indicia from a second matching group of second indicia, the stored program control operable for displaying the pay value on the display in an area separate from the first and second indicia.

2. The apparatus of claim 1, wherein the selected pay value is displayed on the display as the player selects at least one of the selectable first indicia.

3. The apparatus of claim 1, wherein the stored program control is operable to select first and second pay values, from a plurality of possible pay values, and associate the selected first pay value with at least one of the second indicia from a first matching group of second indicia and associate the selected second pay value with at least one of the second indicia from a second matching group of second indicia.

4. The apparatus of claim 3, wherein the first matching group of second indicia is a matching pair of second indicia.

5. The apparatus of claim 4, wherein the matching pair of second indicia comprises two second indicia that have shared commonalities.

6. The apparatus of claim 4, wherein the matching pair of second indicia comprises two second indicia that are substantially identical.

7. The apparatus of claim 3, wherein the stored program control is operable for displaying recognizable indications of each of the second indicia in a matching group of second indicia.

8. The apparatus of claim 7, wherein each recognizable indication is an outline of a second indicia in the group of matching second indicia.

9. The apparatus of claim 8, wherein the stored program control is operable for displaying the second indicia associated with the player selected first indicia in place of, or within, the outline of the second indicia.

10. The apparatus of claim 1, wherein at least one of the associated second indicia is a multiplier indicia, wherein the selected pay value is multiplied by a number associated with the multiplier indicia if the multiplier indicia is revealed.

11. The apparatus of claim 10, wherein the number associated with the multiplier indicia is a positive number.

12. The apparatus of claim 10, wherein at least one of the associated second indicia is a stopper indicia, wherein the end of a game round is signaled when the stopper indicia is revealed.

13. The apparatus of claim 1, wherein at least one of the associated second indicia is a stopper indicia and the end of a game round is signaled when the stopper indicia is revealed.

14. The apparatus of claim 13, wherein, after the stopper indicia is revealed, the game round ends upon revealing at least one additional second indicia in a matching group of revealed second indicia.

15. The apparatus of claim 13, wherein, after the stopper indicia is revealed, the game round ends upon revealing a last second indicia in a matching group of revealed second indicia.

16. The apparatus of claim 1, wherein the stored program control is operable for displaying a recognizable indication of at least one of the second indicia in a matching group of second indicia.

17. The gaming apparatus of claim 1, wherein the stored program control is operable to award a first prize for revealing two matching second indicia and a subsequent prize for revealing a subsequent second indicia matching the two revealed matching second indicia.

18. The apparatus of claim 1, wherein the stored program control is operable to select a first pay value from a first group of possible pay values and a second pay value from a second group of possible pay values, associate the selected first pay value with at least one of the second indicia from a first matching group of second indicia and associate the selected second pay value with at least one of the second indicia from a second matching group of second indicia, the first group of possible pay values including at least one possible pay value greater than each of the possible pay values in the second group of possible pay values.

19. The apparatus of claim 1 in which the stored program control is operable to select first and second pay values and to randomly associate the selected pay value with a matching plurality of said second indicia from said first matching group and to randomly associate the second pay value with a matching plurality of said second indicia from said second matching group.

20. A gaming method comprising:

presenting to a player a set of a plurality of masked indicia;

providing for player selection of and revealing of the indicia in an attempt to reveal at least one group of matching indicia on a display;

selecting a first pay value, from a plurality of possible pay values, wherein the first selected pay value is randomly associated with a first group of matching indicia;

selecting a second pay value from the plurality of possible values;

randomly associating the second selected pay value with at least one of the indicia from a second group of matching indicia;

displaying the pay values on the display in an area separate from the indicia; and paying the player revealing one of the groups of matching indicia an amount equal to the pay value associated with that group.

21. The method of claim 20, further comprising:

providing at least one masked indicia in the form of a multiplier indicia; and paying the player revealing at least one multiplier indicia, and the first group of matching indicia, an amount equal to the first selected pay value multiplied by a number associated with the revealed multiplier indicia.

22. The method of claim 21, further comprising providing at least one masked indicia in the form of a stopper indicia and signaling the end of a game round when the stopper indicia is revealed.

23. The method of claim 22, further comprising displaying the first and second selected pay values during player selection of at least one masked indicia.

24. The gaming method of claim 20, comprising the step of selecting first and second pay values and randomly associating said first pay value with a matching plurality of second indicia from said first matching group and randomly associating said second pay value with a matching plurality of said second indicia from said second matching group.

* * * * *